(12) United States Patent
Florit et al.

(10) Patent No.: US 11,394,536 B2
(45) Date of Patent: Jul. 19, 2022

(54) SESSION KEY DISTRIBUTION INDEPENDENT OF THIRD PARTIES

(71) Applicant: Cisco Technology, Inc., San Jose, CA (US)

(72) Inventors: Lionel Florit, Greenbrae, CA (US); Scott Roy Fluhrer, North Attleboro, MA (US); Amjad Inamdar, Karnataka (IN); David Arthur McGrew, Poolesville, MD (US)

(73) Assignee: CISCO TECHNOLOGY, INC, San Jose, CA (US)

( * ) Notice: Subject to any disclaimer, the term of this patent is extended or adjusted under 35 U.S.C. 154(b) by 117 days.

(21) Appl. No.: 16/749,299

(22) Filed: Jan. 22, 2020

(65) Prior Publication Data
US 2021/0226782 A1    Jul. 22, 2021

(51) Int. Cl.
| | |
|---|---|
| *H04L 9/08* | (2006.01) |
| *H04L 9/32* | (2006.01) |
| *H04L 9/30* | (2006.01) |
| *G06N 10/00* | (2022.01) |

(52) U.S. Cl.
CPC .......... *H04L 9/0844* (2013.01); *G06N 10/00* (2019.01); *H04L 9/0869* (2013.01); *H04L 9/304* (2013.01); *H04L 9/3228* (2013.01)

(58) Field of Classification Search
CPC ..... H04L 9/0844; H04L 9/3228; H04L 9/304; H04L 9/0869; H04L 9/0841; H04L 9/0838; H04L 9/08; H04L 9/32; H04L 9/30; G06N 10/00
See application file for complete search history.

(56) References Cited

U.S. PATENT DOCUMENTS

| | | |
|---|---|---|
| 8,681,982 B2 | 3/2014 | Wiseman et al. |
| 9,071,424 B1 | 6/2015 | Bowness et al. |
| 9,509,506 B2 | 11/2016 | Hughes et al. |
| 9,680,640 B2 | 6/2017 | Hughes et al. |

(Continued)

OTHER PUBLICATIONS

Cohn-Gordon et al., "On Post-Compromise Security", 2016 IEEE 29th Computer Security Foundations Symposium (CSF), IEEE, Jun. 2016, 15 pages.

(Continued)

*Primary Examiner* — Quazi Farooqui
(74) *Attorney, Agent, or Firm* — Edell, Shapiro & Finnan, LLC (57) ABSTRACT

Presented herein are methodologies for establishing secure communications in a post-quantum computer context. The methodology includes receiving, from a first communications device, at a second communications device, a secret seed value, or otherwise obtaining the secret seed value; initializing a session key service with the secret seed value; receiving, from the first communications device, at the second communications device, a pre-shared key identifier; querying the session key service for a pre-shared key corresponding the pre-shared key identifier; receiving, from the session key service, the pre-shared key; deriving a session key based, at least in part, on the pre-shared key; receiving from the first communications device, at the second communications device, data encrypted with the session key; and decrypting the data at the second communications device using the session key.

20 Claims, 5 Drawing Sheets

(56) References Cited

U.S. PATENT DOCUMENTS

| | | | |
|---|---|---|---|
| 10,630,467 B1* | 4/2020 | Gilbert | H04L 9/0844 |
| 10,708,046 B1* | 7/2020 | Ashrafi | H04L 9/3247 |
| 2013/0163759 A1* | 6/2013 | Harrison | H04L 9/0852 |
| | | | 380/268 |
| 2018/0337899 A1 | 11/2018 | Becker et al. | |
| 2019/0373460 A1* | 12/2019 | Kilian | H04L 45/74 |

OTHER PUBLICATIONS

Fluhrer et al., "Postquantum Preshared Keys for IKEv2 draft-fluhrer-qr-ikev2-03", Internet Engineering Task Force, Oct. 28, 2016, 9 pages.

* cited by examiner

SESSION KEY DISTRIBUTION INDEPENDENT OF THIRD PARTIES

TECHNICAL FIELD

The present disclosure relates to secure network communications, and particularly to an approach to secure communications in a post-quantum computer context.

BACKGROUND

It is an open question whether or not it is feasible to build a quantum computer (and if so, when one might be implemented), but if it is, many of the cryptographic algorithms and protocols currently in use may very well become insecure. A quantum computer might, for example, be able to solve Diffie-Hellman and Elliptic-Curve Diffie-Hellman (ECDH) problems in polynomial time, and this would imply that the security of existing Internet Key Exchange (IKE) v2 systems (described by RFC7296) would be compromised. IKEv1 (described by RFC2409), when used with strong pre-shared keys, is believed not to be vulnerable to quantum attacks, because those keys are one of the inputs to the key derivation function. If the pre-shared key has sufficient entropy and the pseudo-random function (PRF), encryption and authentication transforms are quantum computer resistant, then the resulting system is believed to be quantum resistant, that is, invulnerable to an attacker with a quantum computer.

DESCRIPTION OF EXAMPLE EMBODIMENTS

Overview

Presented herein are methodologies for establishing secure communications in a post-quantum computer context. The methodology may include receiving, from a first communications device, at a second communications device, an encrypted secret seed value; decrypting the encrypted secret seed value to obtain the secret seed value; initializing a session key service with the secret seed value; receiving, from the first communications device, at the second communications device, a pre-shared key identifier; querying the session key service for a pre-shared key corresponding the pre-shared key identifier; receiving, from the session key service, the pre-shared key; deriving a session key based, at least in part, on the pre-shared key; receiving from the first communications device, at the second communications device, data encrypted with the session key; and decrypting the data at the second communications device using the session key. In another embodiment, the secret seed value is derived separately by both communications devices via a key exchange between the communications devices.

A device or apparatus is also described. The device may include an interface unit configured to enable network communications, a memory, and one or more processors coupled to the interface unit and the memory, and configured to: receive, an encrypted secret seed value; decrypt the encrypted secret seed value to obtain the secret seed value; initialize a session key service with the secret seed value; receive a pre-shared key identifier; query the session key service for a pre-shared key corresponding the pre-shared key identifier; receive, from the session key service, the pre-shared key; derive a session key based, at least in part, on the pre-shared key; receive data encrypted with the session key; and decrypt the data using the session key. The processor may also be configured to derive the secret seed value based on a key exchange operation.

Example Embodiments

Governments around the world are investing heavily in building quantum computers. Cryptanalytic attacks may be accelerated by these computers. In particular, Shoes algorithm is thought to undermine the foundations for deployed public key cryptography: Rivest-Shamir-Adleman (RSA) and the discrete-logarithm problem in finite fields and elliptic curves. Long-term confidential documents such as patient health-care records and state secrets are supposed to have guaranteed security for many years, but information encrypted today using RSA or elliptic curves and stored until quantum computers are available will then be potentially as easy to decipher as Enigma-encrypted messages are today.

Key exchange mechanisms are considered a weak link and, while there are many approaches in use today, none is believed to be quantum computer resistant.

A recent trend is to use both pre-shared symmetric keys at the same time as conventional public key cryptography. New standards such as S. Fluhrer et al., *Postquantum Preshared Keys for IKEv2*, Internet Engineering Task Force, 2016, are emerging that use this paradigm. However, these standards assume that the pre-shared symmetric key is already in place when the key establishment session begins. That is, this approach does not address the problem of symmetric key distribution.

Pre-shared secret keys are somewhat more difficult to deploy than public keys for the several reasons. First, managing a pool of secret keys shared between different locations is challenging. Second, when a key is compromised, it is difficult to determine that a compromise has occurred, and this creates a security breach unless/until the key can be refreshed. Finally, it can be difficult to refresh and change the pre-shared secret keys.

Cisco Systems, Inc. (San Jose, Calif.) has developed an approach called Session Key Service (SKS), which functions as an interface between an encrypting router and an external (possibly 3rd party) device that allows the encrypter to fetch a secret key that can be combined into the session keys established by IKE or Transport Layer Security (TLS) or similar protocols. Each encrypter is co-located with a key provider device, and those devices are synchronized so that they can provide identical session keys to each side of an IKE or TLS session. The SKS interface allows devices to be used with Quantum Key Distribution (QKD) devices, or with other third-party systems that use conventional cryptography. A post quantum secure key distribution system for an SKS has been developed that uses conventional symmetric cryptography in 'ratcheting' manner, similar to that described in K. Cohn-Gordon, *On Post-Compromise Security*, University of Oxford, 2016. While this scheme is an attractive way to provide post quantum security in products, because it does not have the range, bitrate, and physical layer limitations that QKD has, the symmetric ratchet requires that an initial seed key be installed on each of the SKS key provider devices. That is, this scheme does not solve the key distribution problem.

For public-key encryption, the currently used algorithms based on RSA and Elliptic Curve Cryptography (ECC) are expected to be broken by quantum computers. Code-based cryptography has been studied since 1978 and has withstood attacks very well, including attacks using quantum computers. McEliece with binary Goppa codes using length n=6960, dimension k=5413 and adding t=119 errors is thought to be safe. McEliece has not been used much because of the compute power needed to generate keys and their sheer size (millions of bits). Rekeying McEliece is too expensive.

As a point of reference, the Stehle-Steinfeld version of the so-called NTRU lattice-based cryptosystem is also believed to be quantum resistant.

Symmetric systems are usually not affected by Shor's algorithm, but they are affected by Grover's algorithm. Under a Grover's attack, the best security a key of length n can offer is $2^{n/2}$, so AES-128 offers only $2^{64}$ post-quantum security. AES-256 is recommended, but comes with the shortcomings described earlier.

Quantum Key Distribution (QKD), mentioned above, is a way to distribute commonly shared secrets which can be leveraged to drive the same AES key on both sides. However, QKD requires additional fiber and has distance imitations of 100 Km. Furthermore, it is not well-suited for a large scale WAN deployment with numerous sites which are not likely to be well-served by fiber optic or are simply too far away.

Given the foregoing, embodiments described herein are provided to enable quantum computer resistant, i.e. quantum secure, connectivity between communications devices by distributing (or making available) a same secret key to a large number of sites with zero touch provisioning on a remote site. These embodiments also allow for changing the shared secret key as often as needed with no human intervention.

Figure 1:
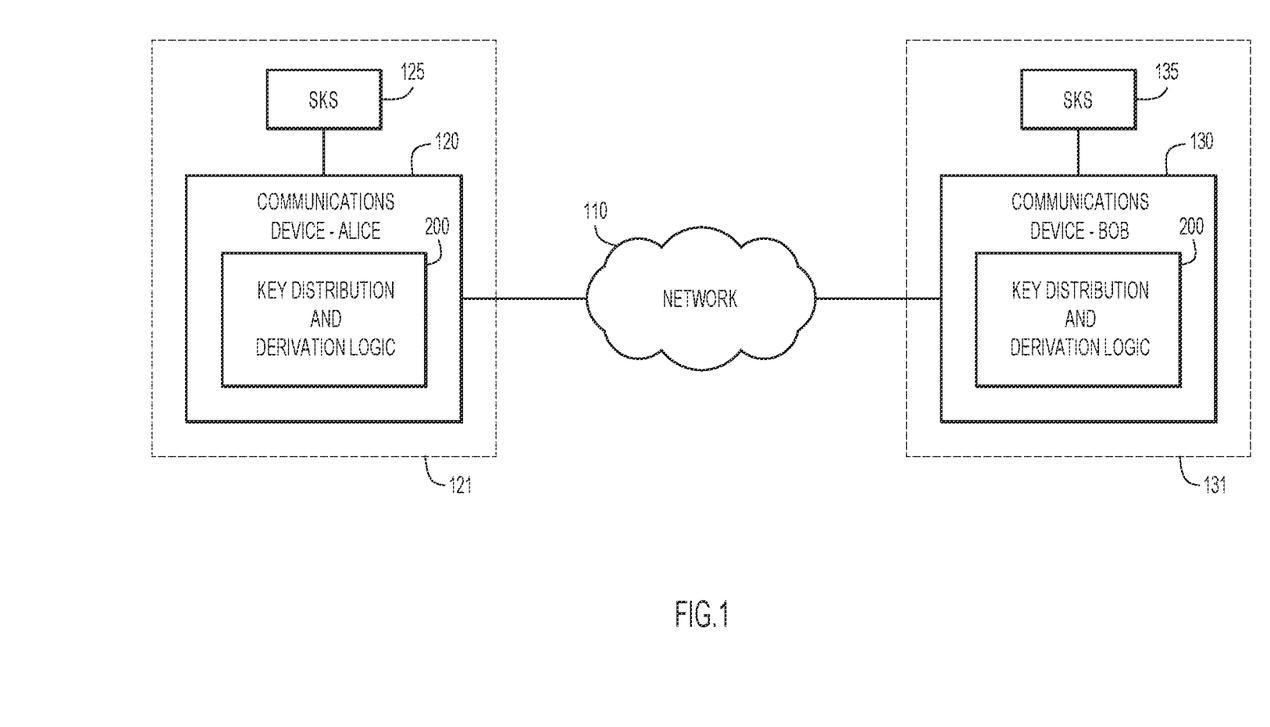
FIG. 1 shows a network topology in which key distribution and derivation logic may be deployed in accordance with an example embodiment.

FIG. 1 shows a network topology in which key distribution and derivation logic 200 may be deployed in accordance with an example embodiment. As shown, a network 110, such as a public network or wide area network (WAN), interconnects a communications device 120 ("Alice") with a communications device 130 ("Bob"). Communications devices 120, 130 may be computers, routers, switches, smart phones, or any other electronic device that might want to establish a secure encrypted connection with another entity. Each communications device 120, 130 hosts key distribution and derivation logic 200, the function of which is described fully below. Each communications device 120, 130 is also in communication, respectively, with its own session key service (SKS) 125. In some embodiments, SKS 125 may be hosted on each of communications devices 120, 130, as indicated by dashed lines 121, 131. The function of SKS 125 will also be described below.

Figure 2:
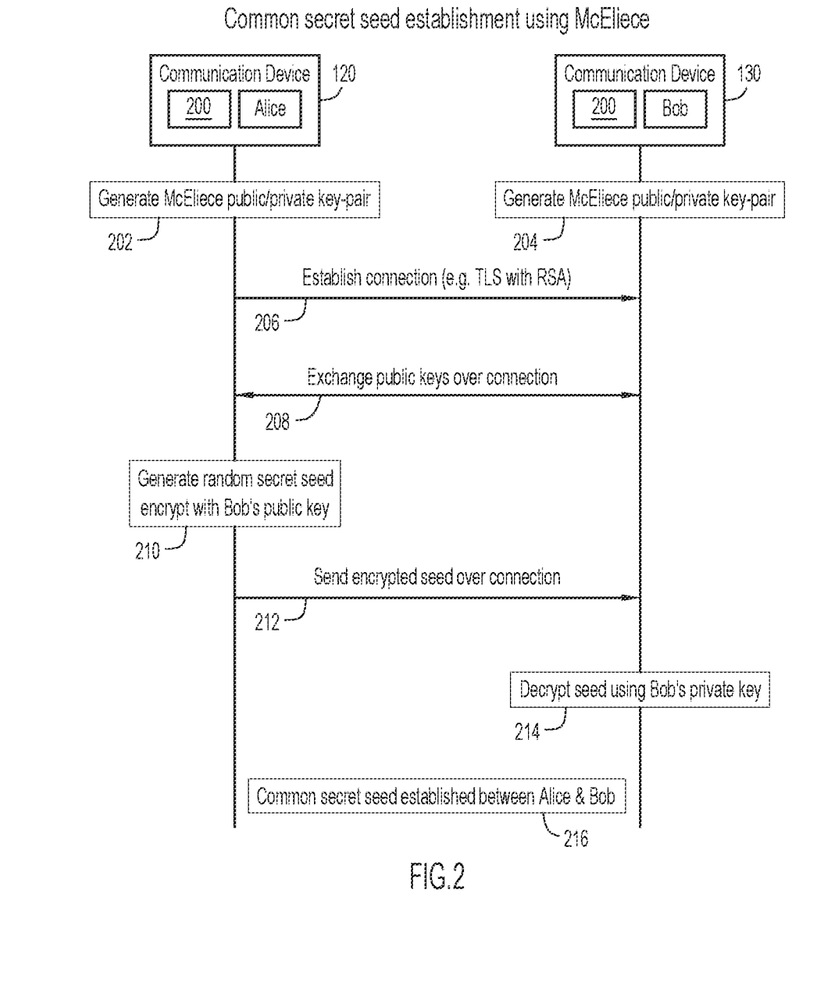
FIG. 2 is a sequence diagram depicting operations to establish a common secret seed value to implement key distribution and derivation in accordance with an example embodiment.

FIG. 2 is a sequence diagram depicting operations to establish a common secret seed value to implement key distribution and derivation in accordance with an example embodiment. In FIG. 2, communications devices 120, 130 are shown. In the example described, Alice, i.e., communications device 120, wants to establish a connection to Bob, i.e., communications device 130. Those skilled in the art will appreciate, in connection with the figures described herein, that Bob could also initiate a connection with Alice. Moreover, Alice could be in contact with a plurality of "Bobs" and Bob could be in contact with a plurality of "Alices", in either a point-to-multipoint or full mesh topology.

At 202, Alice computes a public/private key using a quantum secure algorithm such as McEliece. This computation is done once by Alice. At 204, Bob computes a public/private key using a quantum secure algorithm such as McEliece. This computation is also done once by Bob.

At 206, Alice establishes a secure connection to Bob using a classic mechanism, such as Us with RSA. Operation 206 may instead merely establish a connection to Bob, i.e., the connection need not be secure. At 208, Alice and Bob exchange their respective McEliece public key over the secure connection established at 206. At 210, Alice encrypts a (random) secret seed value using Bob's public McEliece key. At 212, Alice transmits the encrypted secret seed value to Bob. At 214, using his private McEliece key, Bob decrypts the secret seed value. As indicated by 216, Alice and Bob thereafter each have a common secret seed value. Alternatively, Alice and Bob may perform a secure key exchange. That is, Bob may generate a key share (along with a private value), and may send the key share to Alice. Alice may also generate a key share (along with the private value) and may send that key share to Bob. Alice and Bob can then both take their private values, and the key shares they received from the other side, and generate the same shared secret.

Figure 3:
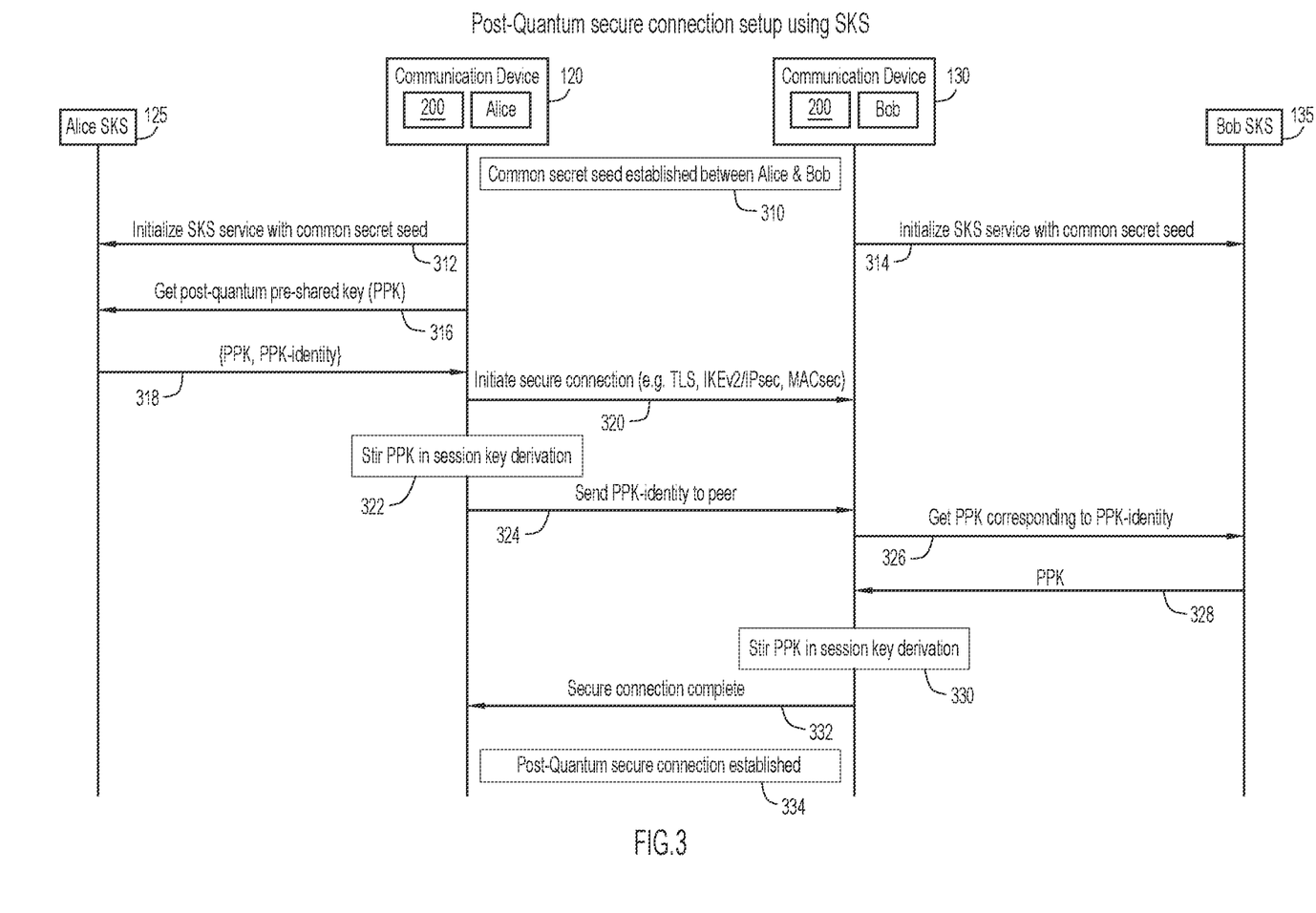
FIG. 3 is a sequence diagram depicting operations, including leveraging the common secret seed value, to establish a quantum computer resistant connection in accordance with an example embodiment.

Thus, FIG. 2 shows how Alice and Bob can share a secret seed value in a way that is believed to be post-quantum safe, using, in one embodiment, McEliece encryption. The secret seed value, as will be apparent in connection with FIG. 3, is leveraged to obtain a key that is shared between Alice and Bob, without Alice and Bob having to exchange such a shared key. That shared key is then used in deriving a session key that is, in turn, used to encrypt data transmitted between Alice and Bob.

More specifically, in a next phase, Alice and Bob use SKS 125, 135 to generate a key/ID pair based on the secret seed value. SKS 125, 135 is a software entity or module that may be implemented inside Alice and Bob, or outside of Alice and Bob. SKS 125, 135 uses ratcheting cryptography to generate a next secret while forgetting about a previous secret.

In accordance with an embodiment, a unique ID is paired with each key generated by SKS 125, 135. Given the same seed secret value as an input parameter to SKS 125, 135, both SKS implementations will generate the exact same key and associated ID. The same key is then used as a shared key, as though such a key were distributed as a shared key. In accordance with an embodiment, SKS 125, 135 can be queried for a next key or for a specific key ID.

FIG. 3 is a sequence diagram depicting operations, including leveraging the common secret seed value, to establish a quantum computer resistant connection in accordance with an example embodiment. In FIG. 3, 310 is equivalent to 216 in FIG. 2, i.e., a secret seed value has been shared by Alice and Bob. At 312 and 314, both Alice and Bob initialize their local SKS 125, 135 instances with the shared secret seed value. At 316, Alice requests SKS 125 for the generation of her first secret, namely a post-quantum pre-shared key (PPK). At 318, Alice receives from SKS 125 a PPK along with its corresponding identity (ID) ("PPK-Identity"). At 320, Alice establishes a secure connection with Bob via TLS, IKEv2, IPSec or Media Access Control Security (MACSec), among other possible secure connection mechanisms. At 322, Alice "stirs" the PPK into its session key derivation mechanism. At 324, Alice sends the PPK-Identity of her corresponding PPK to Bob via the secure connection established at 320. At 326, Bob requests from its local SKS 135 the PPK corresponding to the PPK-Identity received from Alice via the secure connection established at 320. At 328, Bob receives the corresponding PPK. Since Alice's and Bob's SKSs 125 and 135, respectively, have been started or initiated with the same secret seed value, Bob's SKS 135 provides the same PPK as that provided by Alice's SKS 125.

At 330, Bob stirs the PPK into its session key derivation mechanism to obtain, e.g., an AES-256 shared key. At 332, Bob confirms to Alice that he has the same session key for subsequent communication. As indicated by 334, the session keys derived independently by Alice and Bob, which are based on a shared secret that was not distributed by a third party, or any other entity, including Alice or Bob, can be used to enable a post-quantum secure, i.e., quantum computer resistant, connection.

Notably, any time Alice wants to refresh the AES-256 shared key, Alice can again request a PPK, whose PPK-Identity will then be passed to Bob, resulting, ultimately, in a new shared key. As a result, Alice and Bob can refresh their keys at will without any administrative intervention and without ever exhausting their shared keys (since they are generated).

Note that it may not be sufficient to make the PPK-Identity a simple sequence number. Consider that when Bob negotiates with someone, it might not be the real Alice; it might be an attacker. If the attacker claims to be Alice, and says that it uses PPK-Identity #1000000, and if Bob accepts it, Bob's SKS will forget how to create any previous PPKs. Then, when the real Alice tries to negotiate, Bob's SKS will use PPK #3 this time, but Bob cannot generate that PPK any more, yielding a one-exchange permanent denial-of-service (DoS) attack. As such, the PPK-Identity, in one embodiment, includes authentication information (e.g., additional key bits, which Alice includes in the PPK-Identity, and which Bob validates before accepting it (and performing any zeroization).

Figure 4:
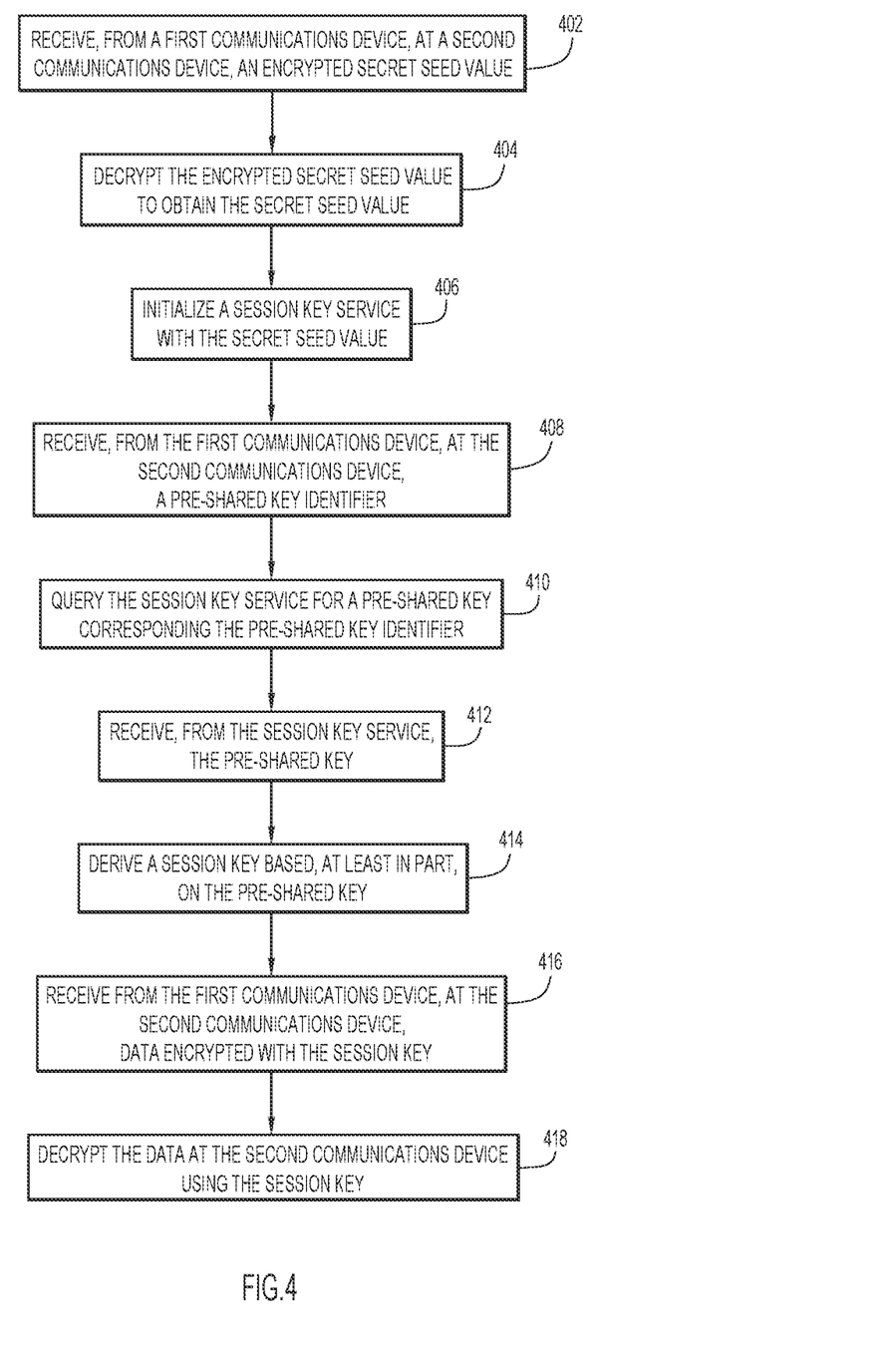
FIG. 4 is a flowchart depicting a series of operations to establish a quantum computer resistant connection in accordance with an example embodiment.

FIG. 4 is a flowchart depicting a series of operations to establish a quantum computer resistant connection in accordance with an example embodiment. As will be appreciated by those skilled in the art, the operations are described from the perspective of Bob (communications device 130). In an embodiment, key distribution and derivation logic 200 (or "the logic") may execute the following operations. At 402, the logic receives, from a first communications device (e.g., Alice), at a second communications device (e.g., Bob), an encrypted secret seed value. At 404, the logic decrypts the encrypted secret seed value to obtain the secret seed value. Alternatively, instead of operations 402 and 404, Alice and Bob may complete a key exchange that enables each of Alice and Bob to obtain the same secret seed value. At 406, the logic initializes a session key service with the secret seed value. At 408, the logic receives, from the first communications device (Alice), at the second communications device (Bob), a pre-shared key identifier. At 410, the logic queries the session key service for a pre-shared key corresponding the pre-shared key identifier. At 412, the logic receives, from the session key service, the pre-shared key corresponding the pre-shared key identifier. At 414, the logic derives a session key based, at least in part, on the pre-shared key. At 416, the logic receives from the first communications device (Alice), at the second communications device (Bob), data encrypted with session key. And at 418, the logic decrypts the data at the second communications device (Bob) using the session key.

As those skilled in the art will appreciate, the embodiments described herein allow for the distribution of a pre-shared secret in large scale networks. The embodiments, also allow for very frequent key refresh with little to no administrative cost. These approaches bring a quantum computer resistant solution to any number of communications devices in a network.

The approaches described herein can be used with a software defined (SD)-WAN between, e.g., virtual edge (vEdge) routers and their controller to secure the control plane. In such a use case, a virtual manage (vManage) component can download the encrypted seed secret to the vEdge routers. In a preferred implementation, there would be one unique seed per vEdge/controller pair. Each vEdge router would compute McEliece keys just once. Once the secret seed values are shared, the control plane becomes quantum computer resistant.

Figure 5:
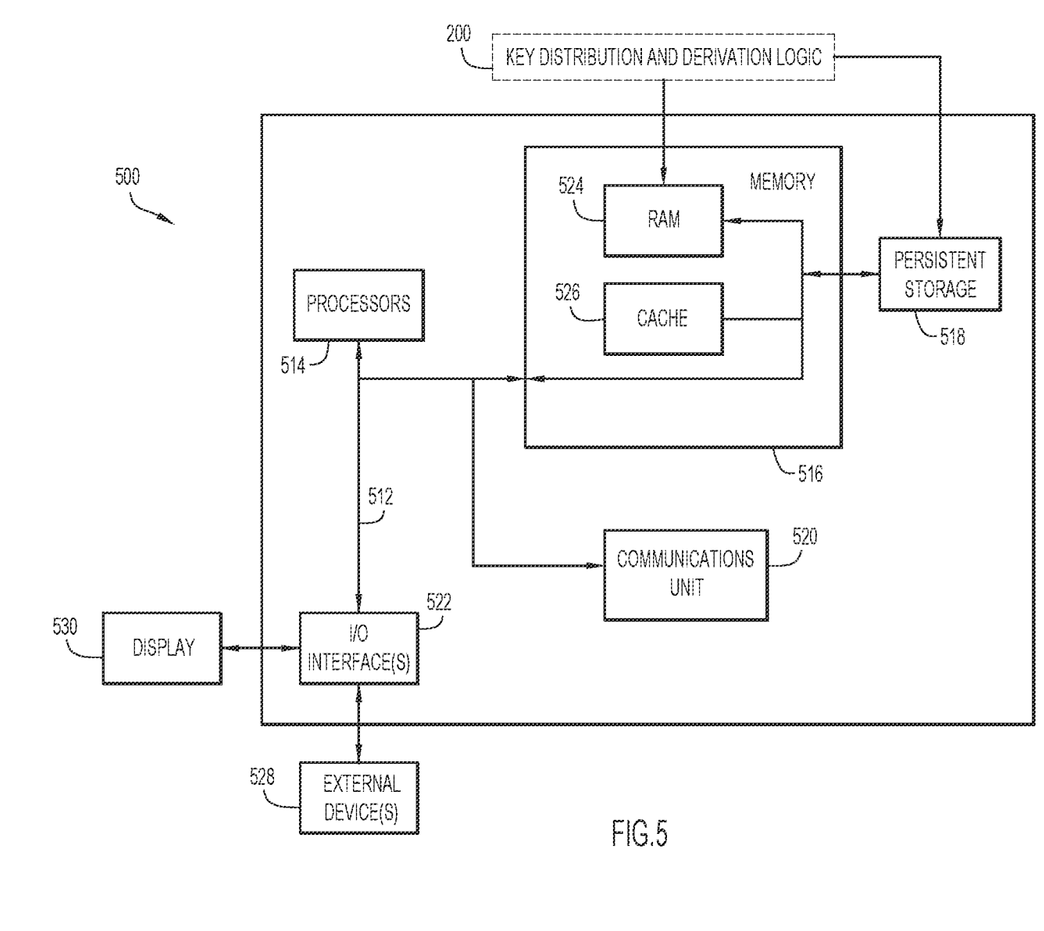
FIG. 5 depicts a device (e.g., a communications device) that executes key distribution and derivation logic in accordance with an example embodiment.

FIG. 5 depicts a device (e.g., a communications device 120, 130) that executes key distribution and derivation logic 200 in accordance with an example embodiment. It should be appreciated that FIG. 5 provides only an illustration of one embodiment and does not imply any limitations with regard to the environments in which different embodiments may be implemented. Many modifications to the depicted environment may be made. Indeed, in many implementations of a device configured to host key distribution and derivation logic 200, much of the hardware described below may not be needed.

As depicted, the device 500 includes a bus 512, which provides communications between computer processor(s) 514, memory 516, persistent storage 518, communications unit 520, and input/output (I/O) interface(s) 522. Bus 512 can be implemented with any architecture designed for passing data and/or control information between processors (such as microprocessors, communications and network processors, etc.), system memory, peripheral devices, and any other hardware components within a system. For example, bus 512 can be implemented with one or more buses.

Memory 516 and persistent storage 518 are computer readable storage media. In the depicted embodiment, memory 516 includes random access memory (RAM) 524 and cache memory 526. In general, memory 516 can include any suitable volatile or non-volatile computer readable storage media. Instructions for the key distribution and derivation logic 200 may be stored in memory 516 or persistent storage 518 for execution by processor(s) 514.

One or more programs may be stored in persistent storage 518 for execution by one or more of the respective computer processors 514 via one or more memories of memory 516. The persistent storage 518 may be a magnetic hard disk drive, a solid state hard drive, a semiconductor storage device, read-only memory (ROM), erasable programmable read-only memory (EPROM), flash memory, or any other computer readable storage media that is capable of storing program instructions or digital information.

The media used by persistent storage 518 may also be removable. For example, a removable hard drive may be used for persistent storage 518. Other examples include optical and magnetic disks, thumb drives, and smart cards that are inserted into a drive for transfer onto another computer readable storage medium that is also part of persistent storage 518.

Communications unit 520, in these examples, provides for communications with other data processing systems or devices. In these examples, communications unit 520 includes one or more network interface cards. Communications unit 520 may provide communications through the use of either or both physical and wireless communications links.

I/O interface(s) 522 allows for input and output of data with other devices that may be connected to computer device 500. For example, I/O interface 522 may provide a connection to external devices 528 such as a keyboard, keypad, a touch screen, and/or some other suitable input device. External devices 528 can also include portable computer readable storage media such as database systems, thumb drives, portable optical or magnetic disks, and memory cards.

Software and data used to practice embodiments can be stored on such portable computer readable storage media and can be loaded onto persistent storage 518 via I/O interface(s) 522. I/O interface(s) 522 may also connect to a display 530. Display 530 provides a mechanism to display data to a user and may be, for example, a computer monitor.

The programs described herein are identified based upon the application for which they are implemented in a specific embodiment. However, it should be appreciated that any particular program nomenclature herein is used merely for convenience, and thus the embodiments should not be limited to use solely in any specific application identified and/or implied by such nomenclature.

Data relating to operations described herein may be stored within any conventional or other data structures (e.g., files, arrays, lists, stacks, queues, records, etc.) and may be stored in any desired storage unit (e.g., database, data or other repositories, queue, etc.). The data transmitted between entities may include any desired format and arrangement, and may include any quantity of any types of fields of any size to store the data. The definition and data model for any datasets may indicate the overall structure in any desired fashion (e.g., computer-related languages, graphical representation, listing, etc.).

The present embodiments may employ any number of any type of user interface (e.g., Graphical User Interface (GUI), command-line, prompt, etc.) for obtaining or providing information (e.g., data relating to scraping network sites), where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

The environment of the present embodiments may include any number of computer or other processing systems (e.g., client or end-user systems, server systems, etc.) and databases or other repositories arranged in any desired fashion, where the present embodiments may be applied to any desired type of computing environment (e.g., cloud computing, client-server, network computing, mainframe, stand-alone systems, etc.). The computer or other processing systems employed by the present embodiments may be implemented by any number of any personal or other type of computer or processing system (e.g., desktop, laptop, PDA, mobile devices, etc.), and may include any commercially available operating system and any combination of commercially available and custom software (e.g., machine learning software, etc.). These systems may include any types of monitors and input devices (e.g., keyboard, mouse, voice recognition, etc.) to enter and/or view information.

It is to be understood that the software of the present embodiments may be implemented in any desired computer language and could be developed by one of ordinary skill in the computer arts based on the functional descriptions contained in the specification and flow charts illustrated in the drawings. Further, any references herein of software performing various functions generally refer to computer systems or processors performing those functions under software control. The computer systems of the present embodiments may alternatively be implemented by any type of hardware and/or other processing circuitry.

Each of the elements described herein may couple to and/or interact with one another through interfaces and/or through any other suitable connection (wired or wireless) that provides a viable pathway for communications. Interconnections, interfaces, and variations thereof discussed herein may be utilized to provide connections among elements in a system and/or may be utilized to provide communications, interactions, operations, etc. among elements that may be directly or indirectly connected in the system. Any combination of interfaces can be provided for elements described herein in order to facilitate operations as discussed for various embodiments described herein.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., LAN, WAN, Intranet, Internet, hardwire, modem connection, wireless, etc.). For example, the functions of the present embodiments may be distributed in any manner among the various end-user/client and server systems, and/or any other intermediary processing devices. The software and/or algorithms described above and illustrated in the flow charts may be modified in any manner that accomplishes the functions described herein. In addition, the functions in the flow charts or description may be performed in any order that accomplishes a desired operation.

The software of the present embodiments may be available on a non-transitory computer usable medium (e.g., magnetic or optical mediums, magneto-optic mediums, floppy diskettes, CD-ROM, DVD, memory devices, etc.) of a stationary or portable program product apparatus or device for use with stand-alone systems or systems connected by a network or other communications medium.

The communication network may be implemented by any number of any type of communications network (e.g., LAN, WAN, Internet, Intranet, VPN, etc.). The computer or other processing systems of the present embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., local area network (LAN), hardwire, wireless link, Intranet, etc.).

The system may employ any number of any conventional or other databases, data stores or storage structures (e.g., files, databases, data structures, data or other repositories, etc.) to store information. The database system may be implemented by any number of any conventional or other databases, data stores or storage structures (e.g., files, databases, data structures, data or other repositories, etc.) to store information. The database system may be included within or coupled to the server and/or client systems. The database systems and/or storage structures may be remote from or local to the computer or other processing systems, and may store any desired data.

The embodiments presented may be in various forms, such as a system, a method, and/or a computer program product at any possible technical detail level of integration. The computer program product may include a computer readable storage medium (or media) having computer readable program instructions thereon for causing a processor to carry out aspects of presented herein.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present embodiments may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Python, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects presented herein.

Aspects of the present embodiments are described herein with reference to flowchart illustrations and/or block diagrams of methods, apparatus (systems), and computer program products according to the embodiments. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In summary, in one form, a method is provided. The method includes initializing a session key service with a secret seed value; receiving, from a first communications device, at a second communications device, a pre-shared key identifier; querying the session key service for a pre-shared key corresponding the pre-shared key identifier; receiving, from the session key service, the pre-shared key; deriving a session key based, at least in part, on the pre-shared key; receiving from the first communications device, at the second communications device, data encrypted with the session key; and decrypting the data at the second communications device using the session key.

In an embodiment, the method may further include receiving, from the first communications device, the secret seed value as an encrypted secret seed value that is encrypted with a quantum computer resistant key.

The quantum computer resistant key may be computed using a McEliece algorithm.

The method may also include obtaining the secret seed value via a key exchange between the first communications device and the second communications device.

The method may also include establishing a secure connection between the first communications device and the second communications device, and receiving the secret seed value via the secure connection.

In one implementation, the session key service is hosted by the second communications device.

In one embodiment, the pre-shared key may be used only once.

In an embodiment, the pre-shared key identifier may include authentication information, and the method may include confirming that the pre-shared key identifier was received from the first communications device based on the authentication information.

The method may still further include encrypting other data using the session key to obtain encrypted other data, and transmitting the encrypted other data to the first communications device.

In another form, a device may also be provided in accordance with an embodiment. The device may include an interface unit configured to enable network communications; a memory; and one or more processors coupled to the interface unit and the memory, and configured to: initialize a session key service with a secret seed value; receive a pre-shared key identifier; query the session key service for a pre-shared key corresponding the pre-shared key identifier; receive, from the session key service, the pre-shared key; derive a session key based, at least in part, on the pre-shared key; receive data encrypted with the session key; and decrypt the data using the session key.

The one or more processors may be further configured to receive the secret seed value encrypted with a quantum computer resistant key.

In an embodiment, the quantum computer resistant key is computed using a McEliece algorithm.

The one or more processors may be further configured to obtain the secret seed value via a key exchange.

In an embodiment, the one or more processors may be further configured to establish a secure connection with a communications device, and the one or more processors may be further configured to receive the secret seed value by receiving the secret seed value via the secure connection.

In an embodiment, the pre-shared key identifier includes authentication information, and the one or more processors may be configured to confirm that the pre-shared key identifier was received from an expected communications device based on the authentication information.

In still another form, a non-transitory computer readable storage media is provided that is encoded with instructions that, when executed by a processor, cause the processor to receive an encrypted secret seed value; decrypt the encrypted secret seed value to obtain a secret seed value; initialize a session key service with the secret seed value; receive a pre-shared key identifier; query the session key service for a pre-shared key corresponding the pre-shared key identifier; receive, from the session key service, the pre-shared key; derive a session key based, at least in part, on the pre-shared key; receive data encrypted with the session key; and decrypt the data using the session key.

In an embodiment, the encrypted secret seed value may be encrypted with a quantum computer resistant key, such as a key is computed using a McEliece algorithm.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
   initializing a session key service with a secret seed value;
   receiving, from a first communications device, at a second communications device, a pre-shared key identifier;
   querying the session key service for a pre-shared key corresponding the pre-shared key identifier;
   receiving, from the session key service, the pre-shared key;
   deriving a session key based, at least in part, on the pre-shared key;
   receiving from the first communications device, at the second communications device, data encrypted with the session key; and
   decrypting the data at the second communications device using the session key,
   wherein the session key is derived, independently, by each of the first communications device and the second communications device, based on the secret seed value, which was derived by the first communications device and sent by the first communications device to the second communications device.

2. The method of claim 1, further comprising receiving, from the first communications device, the secret seed value as an encrypted secret seed value that is encrypted with a quantum computer resistant key.

3. The method of claim 2, wherein the quantum computer resistant key is computed using a McEliece algorithm.

4. The method of claim 1, further comprising obtaining the secret seed value after a public key exchange between the first communications device and the second communications device.

5. The method of claim 1, further comprising establishing a secure connection between the first communications device and the second communications device, and receiving the secret seed value via the secure connection.

6. The method of claim 1, wherein the session key service is hosted by the second communications device.

7. The method of claim 1, wherein the pre-shared key is used only once.

8. The method of claim 1, wherein the pre-shared key identifier includes authentication information.

9. The method of claim 8, further comprising confirming that the pre-shared key identifier was received from the first communications device based on the authentication information.

10. The method of claim 1, further comprising encrypting other data using the session key to obtain encrypted other data, and transmitting the encrypted other data to the first communications device.

11. A device comprising:
an interface unit configured to enable network communications;
a memory; and
one or more processors coupled to the interface unit and the memory, and configured to:
initialize a session key service with a secret seed value;
receive a pre-shared key identifier;
query the session key service for a pre-shared key corresponding the pre-shared key identifier;
receive, from the session key service, the pre-shared key;
derive a session key based, at least in part, on the pre-shared key;
receive data encrypted with the session key; and
decrypt the data using the session key,
wherein the session key is derived, independently, by each of the device and another device, based on the secret seed value, which was derived by the another device and sent by the another device to the device.

12. The device of claim 11, wherein the one or more processors are configured to receive the secret seed value encrypted with a quantum computer resistant key.

13. The device of claim 12, wherein the quantum computer resistant key is computed using a McEliece algorithm.

14. The device of claim 11, wherein the one or more processors are configured to obtain the secret seed value after a public key exchange with the another device.

15. The device of claim 11, wherein the one or more processors are configured to establish a secure connection with the another device, and wherein the one or more processors are configured to receive the secret seed value by receiving the secret seed value via the secure connection.

16. The device of claim 11, wherein the pre-shared key identifier includes authentication information.

17. The device of claim 16, wherein the one or more processors are configured to confirm that the pre-shared key identifier was received from the another device based on the authentication information.

18. A non-transitory computer readable storage media encoded with instructions that, when executed by a processor, cause the processor to:
receive an encrypted secret seed value;
decrypt the encrypted secret seed value to obtain a secret seed value;
initialize a session key service with the secret seed value;
receive a pre-shared key identifier;
query the session key service for a pre-shared key corresponding the pre-shared key identifier;
receive, from the session key service, the pre-shared key;
derive a session key based, at least in part, on the pre-shared key;
receive data encrypted with the session key; and
decrypt the data using the session key,
wherein the session key is derived, independently, by each of a device executing the instructions and another device, based on the secret seed value, which was derived by the another device and sent by the another device to the device executing the instructions.

19. The non-transitory computer readable storage media of claim 18, wherein the encrypted secret seed value is encrypted with a quantum computer resistant key.

20. The non-transitory computer readable storage media of claim 19, wherein the quantum computer resistant key is computed using a McEliece algorithm.

\* \* \* \* \*